2,877,848
PROCESS FOR CLEANING PERMEABLE FORMATIONS

Leslie C. Case, Tulsa, Okla., assignor to Gulf Oil Corporation, Pittsburgh, Pa., a corporation of Pennsylvania No Drawing. Application June 11, 1956
Serial No. 590,406

6 Claims. (Cl. 166—42)

This invention relates to a method of cleaning wells and more particularly to the cleaning of water injection wells used for the disposal of brines or as input wells in water flood operations for the secondary recovery of oil, oil wells, and water wells.

In one method for the secondary recovery of oil by water flooding, water is pumped into a permeable reservoir formation at injection wells to supply the drive necessary to move the oil in the reservoir to the production wells from which the oil is recovered. The permeable reservoir formations are usually uncemented sands, sandstones or limestones. Although the total pore volume of the permeable formations may be substantial, the individual pores are usually small and may be easily plugged by solid materials precipitated from the water pumped into the injection wells.

Many oil wells produce large quantities of brine which are separated at the surface from the oil produced by the well. One method of disposing of the brine is to pump it down a well and into a permeable formation at a depth great enough to insure avoidance of contamination of fresh or surface waters. Injection of the brine into injection wells in water flooding operations is a method frequently used for disposal of brines.

Fresh water, either alone or mixed with brine, can be used in water flooding of reservoirs for the secondary recovery of oil. Both fresh and salt water may contain dissolved salts which are precipitated in the reservoir formation with resulting plugging of the formation. Even though the fresh or salt water is filtered and otherwise treated at the surface before pumping into the well, the waters discharged from the well may contain suspended solids which are filtered out at the formation face to form a filter cake interfering with the flow of water into the permeable formation. Corrosion of equipment, such as the tubing string in the well, may introduce into the water materials having a plugging effect on the formation. Both the precipitation of dissolved salts from the water in the pores in the formation and the filtering effect at the formation face are important causes of plugging of injection wells.

Producing oil wells commonly produce water along with the oil. Water produced with the oil ranges from brackish to quite salty and the ratio of various salts to one another is variable. Certain oil well waters are highly charged with calcium bicarbonate so that during release of pressure during production, solid calcium carbonate is precipitated at the formation face and to some distance within the producing formation, depending upon the depth of pressure decrease. Other oil well waters are saturated with calcium sulfate so that the conditions imposed during production cause precipitation of calcium sulfate. Water wells deposit similar materials, depending upon the nature of the water and the manner of producing the wells. Where water wells are produced by air-lift, calcium carbonate and iron oxide are common constituents of the precipitated products.

This invention resides in cleaning water wells, oil wells and water injection wells to increase the rate at which liquids can be forced into or taken from the permeable formation penetrated by the well in which aqueous solutions of polyamino polycarboxylic compounds are forced into contact with the materials plugging the formation to solubilize them and thereby permit their removal to open the formation to flow of water. This invention also includes the use of polyamino polycarboxylic compounds, particularly alkali metal salts of ethylene diamine tetraacetic acid, in combination with other reagents, and particularly, when plugging is caused by an emulsion of oil and brine flowing through the formation, in combination with a surface active agent.

Among the solid materials most frequently precipitated and causing plugging of the very small pores in the permeable formation through which the water or oil flows are calcium carbonate, calcium sulfate, barium sulfate, strontium sulfate, iron sulfide and iron oxide. These solid precipitates are commonly caused by mixing incompatible waters during the injection process or by contact between the injected waters and the rock in the permeable formation. Precipitates are also produced by reduced pressure resulting from pumping or flowing operations. The iron compounds may be produced by reaction of injected water on steel tubing and casing in the well. With the exception of calcium carbonate, the precipitated salts listed above are not soluble in acids used in cleaning wells by conventional methods. The iron compounds are only difficultly soluble in mineral acids.

The plugging of the formation is most serious within about three to six inches of the formation face. The removal of salts from injection waters resulting from the precipitation occurring when incompatible liquids are mixed, the filtration at the formation face, and the larger area through which the liquid flows as the distance from the formation face increases, combine to make plugging in the formation at a substantial distance from the water injection well less serious. The reduction of pressure on liquids from producing wells is most rapid near the formation face; hence, release of carbon dioxide and precipitation of calcium carbonate is most serious in that region.

The brines separated from oil and used as injection water may be highly corrosive because of high salt and sulfur concentrations. Corrosion of steel equipment often causes substantial iron concentrations in the water, resulting in a rapid build up of a filter cake of iron oxide, hydroxide, or sulfide at the formation face. Because of the large amounts of water injected into the wells, very low concentrations of suspended matter, of the order of 10 p. p. m., will result in the delivery of large quantities of solid materials into the well. For example, 10 p. p. m. is equal to 3½ pounds for each 1,000 barrels of water. An injection well receiving 1,000 barrels of water per day will receive in excess of 1,200 pounds of solid material in one year.

The cleaning of the injection wells is complicated by the presence of oil. When brine is produced with oil, the two liquids are delivered to a separator for separation of the oil and salt water. Complete separation of the oil and brine is not possible as a practical matter. An emulsion of the two liquid phases is formed. Although clean oil does not tend to plug the permeable formation, the emulsion of brine and oil does. Moreover, the oil in the emulsion coats finely divided solid particles produced with the oil and brine, thereby greatly increasing the plugging tendency of the liquids injected into the formation. The coating of oil on the solid particles also interferes with their dissolution.

Cleaning of water injection wells involves a number of unique problems. Generally, it is not possible to heat or agitate the cleaning agent in contact with the formation. No flushing of large particles of plugging materials through the formation is possible. Pores of the formation may be substantially completely closed by solid material precipitated in them, thereby preventing circulating of fresh cleaning agent over the precipitated solid material. It is often not possible to remove the minerals causing the plugging from the formation after they have been solubilized; hence, the solubilizing agent should not permit reversion of the solution formed and reprecipitation of the solids as they are forced farther into the formation. The cleaning agents also should not react with the formation to cause precipitation of insoluble compounds or other effects harmful to the permeability of the formation. All of these difficulties are further aggravated by the presence of oil emulsions in brine injected into the wells.

The compounds useful for cleaning wells by this invention are described generally as polyamino polycarboxylic acid compounds. They include alkylene polyamino polycarboxylic acids. Preferred compounds are alkali metal salts of alkylene polyamino polycarboxylic acids. Combined salts of alkali metals and other metals of polyamino polycarboxylic acids, and polyamino polycarboxylic acids partially neutralized with bi- or tri-valent metals can also be used. Compounds in which organic groups, for example, hydroxy or hydroxyethyl groups are substituted for hydrogen in the polyamino polycarboxylic acids at positions other than in the carboxylic group are suitable for use in this invention.

Of the preferred alkali metal salts of alkylene polyamino polycarboxylic acids, the alkali metal salts of ethylene diamine tetraacetic acids are especially valuable. Any of the mono-, di-, tri-, or tetra-alkali metal salts of ethylene diamine tetraacetic acid can be used. The particular salt that is used will depend in part upon the material causing the plugging of the formation. For example, when it is known that precipitation of calcium carbonate is causing the reduced permeability of the formation, the trisodium salt of ethylene diamine tetraacetic acid is preferred. The sodium salts of ethylene diamine tetraacetic acid are preferred alkali metal salts because of their availability as ordinary commercial products. The alkylene polyamino polycarboxylic acids, for example, ethylene diamine tetraacetic acid, can also be used but are generally not as desirable as their alkali metal salts. Examples of effective substituted polyamino polycarboxylic acid compounds are the trisodium salt of N-hydroxyethyl ethylene diamine triacetic acid and the monosodium salt of N,N-di (a hydroxyethyl) glycine.

Aqueous solutions of the alkali metal salts of ethylene diamine tetraacetic acid are alkaline and tend to remain alkaline when used in the well. A slightly alkaline condition facilitates the formation of complexes of alkaline earth metal compounds. The alkali metal salts of ethylene diamine tetraacetic acid not only solubilize the alkaline earth metal compounds plugging the formation but also hold them in solution to prevent their reprecipitation at points deeper in the formation. When the principal cause of plugging of the injection well is the formation of deposits of iron oxide or iron sulfide, cleaning of the well is improved by the addition of a mineral or organic acid to the alkali metal salt of ethylene diamine tetraacetic acid. Preferred acids are the organic acids such as citric or lactic acid. Iron salts of citric or lactic acid tend to remain soluble whereas iron salts of mineral acids may become neutralized and precipitated by long contact with limestone.

Salts of alkylene polyamino polycarboxylic acids containing a metallic ion in addition to an alkali metal ion are useful. Suitable combined salts that are readily available are salts of ethylene diamine tetraacetic acid containing one calcium, magnesium, cobalt, manganese, copper, zinc, nickel, lead, ferrous, or ferric ion and two sodium ions. Other metallic salts that can be used are monosodium ferric ethylene diamine tetraacetic acid and dihydrogen ferrous ethylene diamine tetraacetic acid.

If an oil emulsion is an important cause of the plugging of the injection well it is necessary to break the emulsion, separate the solid material from the oil solubilize the solids and carry the dissolved material into the formation in a manner to prevent reprecipitation. The polyamino polycarboxylic compounds, and especially the alkali metal salts of ethylene diamine tetraacetic acid, are effective in dispersing emulsions of oil and brine as well as solubilizing the exposed solid materials. The effectiveness of the cleaning agent can be improved, however, by the addition of surface active agents. Preferred surface active agents are those of the non-ionic type because of their stability in the presence of high concentrations of acids and bases and the low adsorption of them by porous rock formations. Common non-ionic surface active agents are those consisting of a polyethylene oxide chain joined to a hydrophobic hydrocarbon residue. Suitable commercial non-ionic surface active agents are Span 40 (sorbitan monopalmitate); Span 80 (sorbitan monooleate); Tween 20 (tris(polyoxyethylene)sorbitan monolaurate); Tween 80 (tris(polyoxyethylene)sorbitan monooleate) sold by Atlas Powder Company and Sterox CD (polyethylene glycol ester of tall oil acids) sold by Monsanto Chemical Company. Other surface active agents which are suitable are those of anionic and cationic types and particularly the alkylaryl sulfonates and sulfated alcohols. The alkali metal salts of ethylene diamine tetraacetic acid are compatible with alkaline materials and can be used with detergent alkaline phosphates when clogging deposits are oily. Strongly alkaline materials such as the alkali metal hydroxides frequently cause the formation of precipitates when in contact with brines of oil formation; hence, it is generally not desirable to use a mixture of the alkali metal salts of ethylene diamine tetraacetic acid and alkali metal hydroxides.

The polyamino polycarboxylic compound is added to the water pumped into the well in the treatment of the well in an amount sufficient to give a concentration of about 1–10% in contact with the oil and solids plugging the formation. A preferred strength of a treating solution is one containing about 5% of a sodium salt of ethylene diamine tetraacetic acid. More dilute solutions are not as effective in solubilizing the deposits causing the plugging. In most instances any gain in solubilizing effect obtained by using more concentrated solutions does not compensate for the increased cost of reagent. The preferred concentration of 5% is the desired concentration in contact with the plugging material in the well. Where the fluid level in the well is high, or where for any reason there will be considerable dilution of the cleaning agent, the concentration of cleaning solution injected at the well head should be higher than 5%, for example, 10% or even higher.

Several different procedures may be used to clean wells by this invention. It is only essential to bring the solution of polyamino polycarboxylic compound, hereinafter referred to as "cleaning solution" into contact with the material causing the plugging of the well. This can be accomplished, for example, by pumping the cleaning solution down the well and continuing the pumping until the initial rate of flow of the well is restored. The dissolved material removed from the well is carried back into the formation.

Another method of treating the well is to "spot" a measured quantity of the cleaning solution in contact with the plugging materials for a period sufficient to solubilize the solids causing the plugging. This can be accomplished by pumping a measured amount of the cleaning solution calculated to replace water or other liquids in the part of the formation that is blocked. The cleaning solution is followed with a measured amount of water calculated to displace the cleaning solution from the well into contact with the plugged formation. The cleaning solution is then left in contact with the formation for a period sufficient to cause dissolution, after which the dissolved material is removed from the formation adjacent the well either by back flow of the well or washing the dissolved salts into the formation.

A preferred method for cleaning the wells is to back flow the well before the introduction of any cleaning solution to wash and mechanically entrain as much of the solid material as possible from the well. The term "back flow" is used to designate flow from the formation into the well. If the pressure on the formation is not sufficient to cause back flow the desired back flow can be accomplished by pumping liquid from the well. After the back flow, cleaning solution is pumped down into the well to spot it in contact with the plugged formation, and left for a period sufficient to dissolve the solid plugging materials. After dissolution of the plugging materials the well is again back flowed to remove the dissolved plugging solids from the well.

The time for dissolution of the plugging material may range from about 1–24 hours depending upon whether or not the well can be back flowed. A period of 1–4 hours, preferably about 2 hours, is sufficient if the well can be back flowed. More time, for example, about 6–8 hours, is required if the well cannot be back flowed. The maximum time of dissolution employed will depend upon the extent of plugging and the characteristics of the particular formation treated. Past experience in cleaning wells in the same formation will serve as a guide to the extent of cleaning required.

In a specific example of this invention a water injection well serving a sandstone formation 15 feet thick at a depth of 4,200 feet and having a porosity of about 22% is treated. The borehole of the well is 7 inches in diameter at the formation face. 200 gallons of a 10% aqueous solution of the trisodium salt of ethylene diamine tetraacetic acid are pumped into the well and followed by 2,740 gallons of clear water to displace the cleaning solution from the 2 inch tubing in the well. The well is closed for six hours to hold the cleaning solution in contact with the formation at the formation face. After six hours injection of water in the usual manner is resumed.

The following examples illustrate the cleaning of permeable sands by the process of this invention.

Example 1

Tulsa city water at a pressure of 50 p. s. i. was pumped through a bed of pure quartz sand 3½ inches deep. The initial rate of flow of the water through the bed was measured. The sand bed was then partially plugged by adding ferric oxide to the water and forcing the resulting suspension through the bed with 50 p. s. i. water pressure. After the partial plugging the rate of flow of water through the sand was measured. The bed was then cleaned by filling the bed with a 5% aqueous solution of the disodium salt of ethylene diamine tetraacetic acid and leaving the solution in place for a period of 2 hours. Tulsa city water was then pumped through the bed at a pressure of 50 p. s. i. and the rate of flow of the water measured. The rates of flow through the sand were as follows:

Initial rate: 30 ml./sec.
After plugging with ferric hydroxide: 8.5 ml./sec.
After treatment with 5% solution disodium salt of EDTA: 30 ml./sec.

Example 2

The procedure described for Example 1 was repeated with the exception that the sand was plugged with ferrous sulfide and the cleaning agent used was a 5% aqueous solution of the disodium salt of ethylene diamine tetraacetic acid. The rates of flow through the sand were as follows:

Initial rate: 30 ml./sec.
After plugging with ferrous sulfide: 10.5 ml./sec.
After treatment with disodium salt of EDTA: 25 ml./sec.

Example 3

The procedure described for Example 1 was repeated with the exception that the sand was partially plugged with a suspension of calcium carbonate and the cleaning agent was a 5% aqueous solution of disodium diethylene diamine tetraacetic acid. The rates of flow through the sand were as follows:

Initial rate: 25 ml./sec.
After plugging with $CaCO_3$: 15 ml./sec.
After treatment with disodium salt of EDTA: 25 ml./sec.

Example 4

The procedure described for Example 1 was repeated with the exceptions that the solids suspended in the water were barium sulfate and the cleaning treatment was with a 5% aqueous solution of the tetrasodium salt of ethylene diamine tetraacetic acid. The rates of flow through the sand were as follows:

Initial rate: 26 ml./sec.
After plugging with $BaSO_4$: 18 ml./sec.
After treatment with 5% tetrasodium salt of EDTA: 25.5 ml./sec.

Example 5

The procedure described for Example 1 was repeated with the exceptions that the sand bed was plugged with a natural crude oil emulsion and that after treating with a 5% solution of disodium salt of ethylene diamine tetraacetic acid and measuring the rate of flow of water through the sand bed thus cleaned, the sand bed was again treated with a 5% aqueous solution of the disodium salt of ethylene diamine tetraacetic acid and 0.5% of a wetting agent. The wetting agent was "Santomerse No. 1" an alkylaryl sulfonate surface active agent of Monsanto Chemical Company. The rates of flow through the sand were as follows:

Initial rate: 24 ml./sec.
After plugging with natural crude oil emulsion: 14 ml./sec.
After treating with 5% disodium salt of EDTA: 19 ml./sec.
After treating with 5% disodium salt of EDTA, plus wetting agent: 23 ml./sec.

Example 6

The procedure described for Example 1 was repeated with the exception that the solids suspended in the water for partial plugging of the bed were magnesium carbonate and that the treatment of the bed was with a 30% solution of the tetrasodium salt of ethylene diamine tetraacetic acid diluted in a 1:4 ratio with oil field brine having a specific gravity of 1.07. The rates of flow through the sand were as follows:

Initial rate: 22 ml./sec.
After plugging with $MgCO_3$: 12.5 ml./sec.
After treating with 30% solution of tetrasodium salt of EDTA, diluted 1:4 with an oil field brine of sp. gr. 1.07: 20 ml./sec.

Example 7

Tap water was pumped through a bed of pure quartz sand and the rate of flow through the bed was measured. A pressure of 50 p. s. i. was employed. The bed was then partially plugged with an emulsion of crude oil, water and calcium sulfate in proportions of 45:45:10 by weight. The emulsion was forced into the bed of sand to a depth of 3½ inches by air pressure. After plugging the sand with the emulsion, the rate of flow of tap water through the bed was measured. The bed was then treated by filling with a 5% solution of tetra sodium salt of ethylene diamine tetraacetic acid after which the rate of flow of water through the bed was measured. The bed was then additionally treated with a 5% aqueous solution of tetra sodium salt of ethylene diamine tetraacetic acid plus 1% of "Triton X–100" an alkylaryl polyether alcohol, a non-ionic surfactant after which the rate of flow of water through the bed was measured. The rates of flow through the sand were as follows:

Initial rate: 35.7 ml./sec.
After plugging with emulsion: 26 ml./sec.
After treating with 5% tetrasodium salt of ethylene diamine tetraacetic acid (EDTA): 30.5 ml./sec.
After treating with 5% EDTA plus 1% of non-ionic surfactant: 35.0 ml./sec.

*Example 8*

A procedure described for Example 7 was repeated with the exception that the bed was treated with a 2% aqueous solution of tetra sodium salt of ethylene diamine tetraacetic acid plus 0.5% of "Aquet" (aromatic polyglycol ether) a non-ionic surfactant. The rates of flow through the sand were as follows:

Initial rate: 29.5 ml./sec.
After plugging with emulsion: 20 ml./sec.
After treating with 2% EDTA plus 0.5% non-ionic surfactant: 28 ml./sec.

*Example 9*

A quartz sand bed was plugged with an emulsion of crude oil, water, and calcium sulfate in the ratio of 45:45:10 by weight after the rate of flow of clear water under a pressure of 50 p.s.i. through the bed had been measured. The rate of flow through the plugged bed was then measured after the plugging. The plugged bed was then treated by filling with a 1% aqueous solution of the tetrasodium salt of ethylene diamine tetraacetic acid after which the rate of flow of clean water through the bed was measured. The bed was then additionally treated with 1% solution of the tetrasodium salt of ethylene diamine tetraacetic acid plus 1% of an aromatic polyglycol ether non-ionic surfactant and the rate of flow of clean water through the bed was again determined. The bed of sand was then filled with a 10% solution of tetrasodium salt of ethylene diamine tetraacetic acid and allowed to stand 3 hours after which the rate of flow of clean water through the bed was measured. The rates of flow through the sand were as follows:

Initial rate: 30.5 ml./sec.
After plugging with emulsion: 18.5 ml./sec.
After treating with 1% EDTA: 22 ml./sec.
After treating with 1% EDTA plus 1% non-ionic surfactant: 27 ml./sec.[1]
After treating with 10% EDTA: 30.5 ml./sec.[2]

[1] All oil appeared to leave sand filter, but some of the calcium sulfate evidently remained.
[2] Filter filled with treating fluid and allowed to stand 3 hours before flushing with water.

This invention is valuable in cleaning wells in limestone formations to increase the permeability of the limestone as well as in sandstone or uncemented sand formations. In addition to removing the filter cake on the formation face, the cleaning solution, unlike mineral acids, penetrates the formation and solubilizes the deposits at some distance from the formation face. The action of the cleaning solution is apparently slow enough to allow the solution to move well into the limestone formation before it is consumed by the large amount of calcium carbonate present.

I claim:

1. A process for cleaning a well which has become at least partially plugged by the deposition of water-insoluble solids in the permeable formation adjacent the borehole of the well through which liquids pass during operation of the well consisting essentially of displacing an aqueous solution containing about 1 to 10% of a compound selected from the group consisting of ethylene diamine tetraacetic acid, an alkali metal salt of ethylene diamine tetraacetic acid, a substituted ethylene diamine tetraacetic acid, an alkali metal salt of a substituted ethylene diamine tetraacetic acid, ethylene diamine triacetic acid, and an alkali metal salt of a substituted ethylene diamine triacetic acid down the well and into the permeable formation adjacent the borehole of the well; maintaining said aqueous solution in contact with the solids plugging the formation for a period of at least about 1 hour sufficient to solubilize said solids; and removing solubilized solids from the permeable formation adjacent the borehole of the well.

2. A process as set forth in claim 1 in which the compound is ethylene diamine tetraacetic acid.

3. A process as set forth in claim 1 in which the compound is an alkali metal salt of ethylene diamine tetraacetic acid.

4. A process for cleaning a water injection well which has become at least partially plugged by the deposition of water insoluble solids at the borehole wall and in the permeable formation adjacent the borehole of the well consisting essentially of displacing an aqueous solution containing about 1 to 10% of a compound selected from the group consisting of ethylene diamine tetraacetic acid, an alkali metal salt of ethylene diamine tetraacetic acid, a substituted ethylene diamine tetraacetic acid, an alkali metal salt of a substituted ethylene diamine tetraacetic acid, ethylene diamine triacetic acid, and an alkali metal salt of a substituted ethylene diamine triacetic acid down the well and into the permeable formation for contact with the solids plugging the well, maintaining the aqueous solution in contact with the solids plugging the well for a period of at least 1 hour sufficient to solubilize them, and then pumping water into the well and displacing solubilized solids away from the borehole of the well and into the permeable formation remote from the well.

5. A process for cleaning a well which has become at least partially plugged by the deposition of water-insoluble solids and an emulsion of oil and water in the permeable formation adjacent the borehole of the well through which liquids pass during operation of the well consisting essentially of displacing an aqueous solution containing about 1 to 10% of a compound selected from the group consisting of ethylene diamine tetraacetic acid, an alkali metal salt of ethylene diamine tetraacetic acid, a substituted ethylene diamine tetraacetic acid, an alkali metal salt of a substituted ethylene diamine tetraacetic acid, ethylene diamine triacetic acid, and an alkali metal salt of a substituted ethylene diamine triacetic acid and a surface active agent selected from the group consisting of non-ionic surface active agents, alkylaryl sulfonates, sulfated alcohols, and detergent alkaline phosphates down the well and into the permeable formation adjacent the borehole of the well; maintaining said aqueous solution in contact with the solids plugging the formation for a period of at least about 1 hour sufficient to solubilize said solids; and removing solubilized solids from the permeable formation adjacent the borehole of the well.

6. A process for cleaning a well which has become at least partially plugged by the deposition of water-insoluble solids in the permeable formation adjacent the borehole of the well through which liquids pass during operation of the well consisting essentially of displacing an aqueous solution containing about 1 to 10% of a compound selected from the group consisting of ethylene diamine tetraacetic acid, an alkali metal salt of ethylene diamine tetraacetic acid, a substituted ethylene diamine tetraacetic acid, an alkali metal salt of a substituted ethylene diamine tetraacetic acid, ethylene diamine triacetic acid, and an alkali metal salt of a substituted ethylene diamine triacetic acid down the well and into the permeable formation adjacent the borehole of the well; maintaining said aqueous solution in contact with the solids plugging the formation for a period of at least about 1 hour sufficient to solubilize said solids; back flowing solubilized solids from the formation into the borehole; and lifting the solubilized solids from the borehole.

References Cited in the file of this patent

UNITED STATES PATENTS 2,238,930    Chamberlain et al. _____ Apr. 22, 1941

OTHER REFERENCES

Martel et al.: Chemistry of the Metal Chelate Compounds, pub. 1952 by Prentice-Hall, Inc., pp. 507 to 512, particularly pages 511 and 512.